Figure 1:
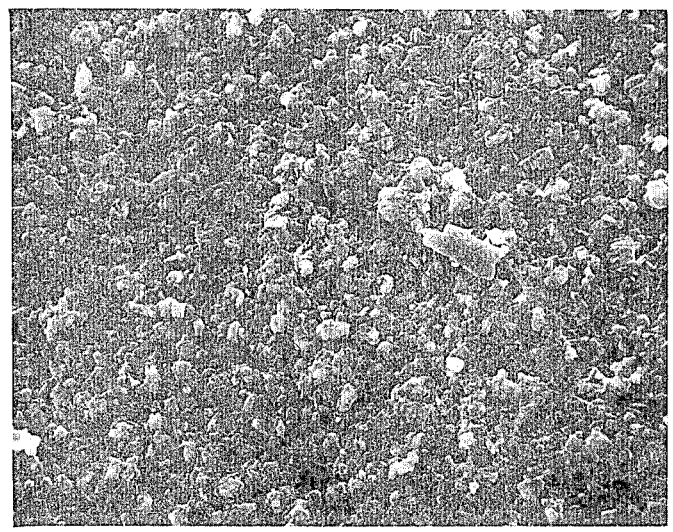

United States Patent [19]

Singh

[11] 4,425,415

[45] Jan. 10, 1984

[54] ETCHED BETA"-ALUMINA CERAMIC ELECTROLYTE

[75] Inventor: Raj N. Singh, Schenectady, N.Y.

[73] Assignee: General Electric Company, Schenectady, N.Y.

[21] Appl. No.: 409,399

[22] Filed: Aug. 19, 1982

Related U.S. Application Data

[62] Division of Ser. No. 289,580, Aug. 3, 1981, Pat. No. 4,381,968.

[51] Int. Cl.$^3$ ............................................. H01M 6/18
[52] U.S. Cl. .................................. 429/193; 204/421; 252/62.2
[58] Field of Search ............ 429/193, 191, 192, 30–33, 429/104; 204/195 S; 252/62.2; 501/41, 153; 156/636, 667, 903, 663

[56] References Cited

U.S. PATENT DOCUMENTS

| | | | |
|---|---|---|---|
| 3,546,036 | 12/1970 | Manasevit | 156/17 |
| 3,895,963 | 7/1975 | McGowan et al. | 252/463 |
| 4,135,040 | 1/1979 | Thornton | 429/191 |
| 4,348,468 | 9/1982 | Wright | 429/193 |
| 4,374,701 | 2/1983 | Singh | 429/193 X |

Primary Examiner—Charles F. LeFevour
Attorney, Agent, or Firm—Jane M. Binkowski; James C. Davis, Jr.; James Magee, Jr.

[57] ABSTRACT

A cationically-conductive sodium beta"-alumina electrolyte showing asymmetric polarization is contacted with phosphoric acid to produce an etched electrolyte showing no asymmetric polarization.

8 Claims, 3 Drawing Figures

ETCHED BETA"-ALUMINA CERAMIC ELECTROLYTE

This application is a division of application Ser. No. 289,580, filed Aug. 3, 1981.

The present invention relates to a cationically-conductive alkali metal beta"-alumina ceramic electrolyte particularly useful in a sodium-sulfur cell or battery. In one particular aspect, it relates to the chemical etching of the ceramic electrolyte to remove or avoid asymmetric polarization. In another particular aspect, it relates to the etched ceramic electrolyte of symmetric polarization.

A sodium-sulfur battery utilizes a ceramic separator material based on either sodium bata- and/or sodium beata"-alumina phases. The ceramic separator also performs as an electrolyte which preferentially allows only sodium ion migration during the operation of the battery. Specifically, the sodium-sulfur battery operates at about 330° C., and both sodium and sulfur are molten at the battery operating temperature. The separator between the sodium and the sulfur electrodes is a solid ionic membrane, usually just called beta-alumina (a chemical compound of $Na_2O$ and $Al_2O_3$, often with dopants such as $Li_2O$ and/or $MgO$). This solid ceramic membrane allows only $Na^+$-ion transport.

As in any other battery, the basic building block is a cell. Presently, the sodium-sulfur cell is cylindrical in geometry, and employs a closed-end sodium beta-alumina ceramic tube. In most designs, the inside of the tube is filled with sodium. Since sulfur is a poor conductor of electricity, a porous carbon matrix is used as the current collector. The beta-alumina ceramic tube is sealed onto a donut-shaped ceramic insulating disc to create a complete physical-chemical separation between the sodium-sulfur electrodes. The sodium and the sulfur containers serve as current collectors. In a battery, many sodium-sulfur cells are connected electrically in series/parallel.

A sodium-sulfur battery utilizing sodium beta"-alumina electrolyte offers advantages of superior energy efficiency than a battery system that utilizes sodium beta-alumina electrolyte.

A number of electrolytes of sodium beta"-alumina phase composition, or a mixture of sodium beta- and beta"-alumina phase composition wherein the beta"-alumina phase was present in a predominant amount, have been fabricated so far; however, most in as-sintered state have shown deleterious effects of asymmetric polarization and resistivity aging, i.e. increase in the electrolyte resisitivity with usage in the Na/S battery system. It was experimentally found that these ceramic electrolytes processed in a normal manner show the presence of soda-rich phases as well as glassy metastable phase. In addition, impurity phases have also been found. It was suspected that the presence of these phases cause ceramics to be more sensitive to the atmospheric contaminants like moisture and $CO_2$ causing the ceramic to polarize in an asymmetric manner. The present invention is directed to removing asymmetric polarization by removing these asymmetric polarization-causing phases or material from the electrolyte surfaces. In contrast, the electrolytes of sodium beta-alumina phase composition do not show asymmetric polarization.

Figure 2:
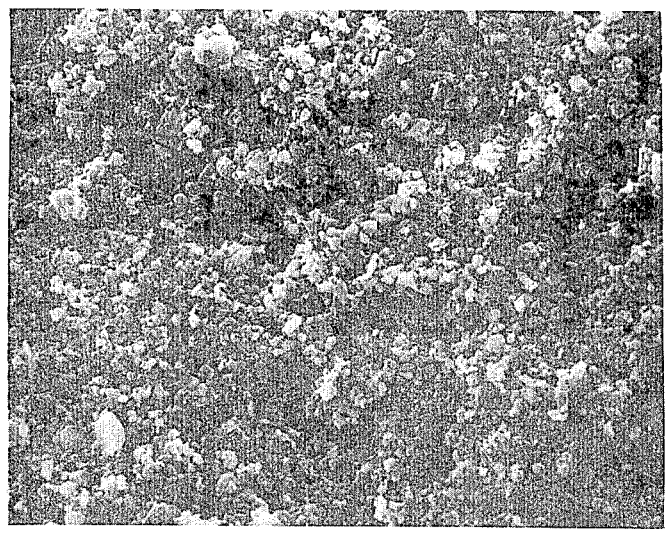
Figure 3:
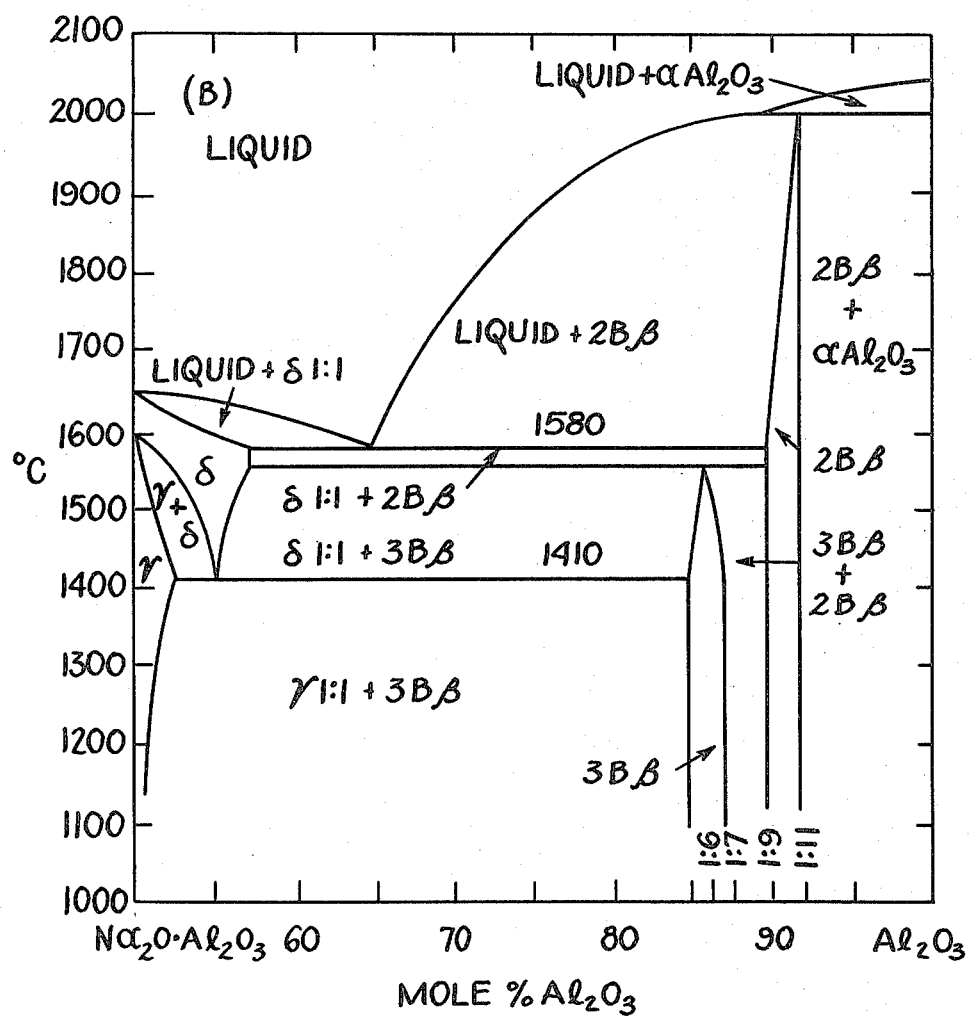

Those skilled in the art will gain a further and better understanding of the present invention from the detailed description set forth below, considered in conjunction with the figures accompanying and forming a part of the specification, in which:

FIG. 1 is a scanning electron micrograph (magnified 1000X) of an as-sintered sodium beta"-alumina polycrystalline ceramic electrolyte of asymmetric polarization;

FIG. 2 is a scanning electron micrograph (magnified 1000X) of the electrolyte of FIG. 1 after it was etched producing an etched electrolyte of symmetric polarization according to the present invention; and FIG. 3 is a phase diagram of the system $Na_2O.Al_2O_3$ which is shown on page 367 of "Evaluation of the Literature Data on $\beta$-$Al_2O_3$ and Related Phases," R. C. DeVries and W. L. Roth, Journal of American Ceramic Society, Vol. 52, No. 7, pages 364–369, wherein 2B $\beta$ denotes sodium beta-sodium phase and 3B $\beta$ denotes sodium beta"-alumina phase.

Briefly stated, the present method comprises providing a cationically-conductive polycrystalline ceramic electrolyte of asymmetric polarization, said ceramic electrolyte ranging in composition from an alkali metal beta--alumina phase to a mixture of alkali metal beta"-alumina phase and up to about 50% by volume of alkali metal beta-alumina phase based on the total volume of the electrolyte, said alkali metal being selected from the group consisting of sodium, potassium, lithium, mixtures thereof and alloys thereof, and etching the surface portion of said ceramic electrolyte with phosphoric acid to produce a cationically-conductive ceramic electrolyte of symmetric polarization, said phosphoric acid having a concentration of $P_2O_5$ which etches said ceramic electrolyte, said etching having no significant deleterious effect on said ceramic electrolyte.

In a sodium-sulfur cell or battery, there are two kinds of resistances measured, a discharge resistance and a charge resistance. When the discharge resistance is significantly higher than the charge resistance, that is called asymmetric polarization. As used herein, an electrolyte of asymmetric polarization is one which shows or will show asymmetric polarization when used as an electrolyte in a sodium-sulfur cell or battery, or an equivalent cell or battery. Also, as used herein, an electrolyte of symmetric polarization is one which shows or will show symmetric polarization, i.e. discharge resistance equal to or not significantly different from charge resistance, when used as an electrolyte in a sodium-sulfur cell or battery or an equivalent cell or battery.

The cationically conductive polycrystalline ceramic electrolyte of asymmetric polarization in the present process usually is composed of alkali metal beta"-alumina phase. However, it can be of asymmetric polarization and be comprised of a mixture of alkali metal beta"-alumina phase and up to about 50% by volume of alkali metal beta-alumina phase based on the total volume of the electrolyte. This ceramic electrolyte covers a wide range of non-stoichiometric as well as stoichiometric compounds of alkali metal oxide and alumina and can be represented by the formula $A_2O.xAl_2O_3$ where A is the alkali metal and x can vary from about 5 to about 11. The alkali metal is selected from the group consisting of sodium, potassium, lithium, mixtures thereof, and alloys thereof. The composition of the ceramic electrolyte can be determined by a number of techniques such as, for example, X-ray diffraction analysis and X-ray fluorescence analysis.

The present ceramic electrolyte contains a stabilizer, i.e. stabilizing agent, for the beta"-alumina phase. This stabilizer is selected from the group consisting of $Li_2O$, MgO, NiO, CoO and mixtures thereof. It is used in at least a stabilizing amount and usually ranges up to about 5% by weight of the electrolyte.

The alkali metal beta-alumina phase herein denotes that crystal structure in which the unit cell contains two spinel-like blocks, each with four layers of oxygen atoms, counting along the c-direction, with aluminum atoms in certain interstitial positions. The unit cell has a crystallographic repeat distance along the c-axis of approximately 22 Å. Monovalent cations are mobile in the rather loosely packed planes separating the individual spinel blocks. On the other hand, the alkali metal beta"-alumina phase denotes herein that the unit cell contains three spinel-like blocks and the crystallographic repeat distance is about 33 Å along the c-axis. In the alkali metal beta-alumina phase each spinel-like block is rotated 180° with respect to an adjacent one while in the alkali metal beta"-alumina phase, the rotation is 120°. In other words, the loosely packed conducting plane is also a mirror plane in the alkali metal beta-alumina phase but not in the alkali metal beta"-alumina phase.

The ceramic electrolyte of asymmetric polarization to be etched can be prepared by a number of techniques. For example, a green body can be shaped in a conventional manner from the alkali metal beta-alumina powder or a mixture of reactants, for example a mixture of sodium oxide, lithium oxide, magnesium oxide, and alumina, which will produce the present alkali metal beta"-alumina or a mixture thereof with the alkali metal beta-alumina. The green body can be produced in a conventional manner such as isostatic pressing or slip casting. It can be in any desired shape and size, and it can be of a geometrically complex and/or hollow form. Preferably, it is in the form of a hollow tube closed at one end which, when fired, will be suitable for use in a sodium-sulfur battery. Such a hollow tube can be prepared by a conventional ceramic processing technique, or by electrophoretic deposition as disclosed in U.S. Pat. No. 3,900,381 to R. W. Powers, incorporated herein by reference and assigned to the assignee hereof. The green body or hollow tube preferably has a density of at least about 40%, and preferably at least 50%, of the theoretical density for beta-$Al_2O_3$, i.e. 3.26 g/cc, to promote shrinkage to high density. The green body is sintered in an atmosphere which has no significant deleterious effect on it at sintering temperatures which may range from about 1525° C. to about 1825° C. For use as an electrolyte in a sodium-sulfur cell or battery, the sintered ceramic body has a density greater than 98%, and preferably greater than 99%, of the theoretical density for beta-$Al_2O_3$, i.e. 3.26 g/cc. Copending Ser. No. 180,600, entitled "Production of Beta-Alumina Ceramic Tubes" filed on Aug. 25, 1980 in the name of Robert W. Powers et al, incorporated herein by reference and assigned to the assignee hereof, discloses the production of sintered sodium beta-, beta"-alumina cylindrical tubes of uniform shape suitable for use as an electrolyte in a sodium-sulfur battery which are useful in the present process.

The phosphoric acid used in the present process is a viscous liquid. It is comprised of water and $P_2O_5$, i.e. it is the reaction product of $P_2O_5$ and water, and it has a concentration of $P_2O_5$ which etches the ceramic body. Specifically, the present phosphoric acid can range in concentration of $P_2O_5$ from about 60% by weight to about 70% by weight of the total weight of the acid. A phosphoric acid having a concentration of $P_2O_5$ lower than about 60% by weight may not etch the ceramic body, or may etch it at a rate too slow to be practical. At atmospheric pressure, phosphoric acid begins to boil at a temperature ranging from about 120° C. to about 160° C., depending on its specific concentration. Since the acid vaporizes and increases in concentration as it boils, its boiling point increases continuously. Therefore, the rate of etching of the ceramic body increases substantially when the etching phosphoric acid is kept boiling. A phosphoric acid with a $P_2O_5$ concentration approaching or about 70% by weight may also polish the surface producing a ceramic body with a polished surface portion as well as an etched surface portion. Polishing also removes the asymmetric polarization-causing phases from the ceramic body, and the resulting polished/etched cationically-conductive ceramic body constitutes another embodiment of the present invention.

A phosphoric acid having a concentration of $H_3PO_4$ of about 85 weight percent is approximately equal to a phosphoric acid having a $P_2O_5$ concentration of about 60 weight %. Since commercially available phosphoric acid does not have the required concentration of $P_2O_5$, it can be boiled to attain the desired concentration. The specific $P_2O_5$ concentration of the acid is determinable by measuring specific gravity. Alternatively, a highly concentrated phosphoric acid can be purchased and admixed with a less concentrated phosphoric acid to produce the present phosphoric acid.

In the present process, the ceramic electrolyte is contacted with the phosphoric acid and its surface or surface portion etched to remove the asymmetric polarization-causing phases therefrom and produce a cationically-conductive electrolyte of symmetric polarization. The extent of such etching is determinable empirically, and usually, it is completed by the etching away, i.e. removal, of about 3 microns to about 5 microns of the surface of the ceramic body. Acid contact time and temperature of treatment should be controlled so as not to over-etch the ceramic body thereby causing the generation of surface flaws/crack nucleation sites which will lead to premature failure of the ceramic body or electrolyte. Specifically, in carrying out the present etching, acid concentration, contact time and temperature are interrelated factors with the rate of etching ordinarily increasing with increasing acid concentration and increasing temperature. Any etching temperature can be used at which the rate of etching is practical and desirable, and generally etching temperature can range from about room temperature to a temperature below 250° C. At room temperature the present etching of the ceramic electrolyte can be completed in a contact time of about 30 minutes. On the other hand, etching by contacting the ceramic electrolyte with the present phosphoric acid at about 150° C. can be completed in a contact time of from about 2 minutes to about 10 minutes. Preferably, for better control of the etching rate, the present etching is carried out at a temperature ranging from about 100° C. to about 200° C. To prevent thermal shock, the ceramic electrolyte should be at a temperature substantially the same as that of the contacting etching phosphoric acid, usually ±25° C. of the temperature of the etching phosphoric acid.

The ceramic electrolyte can be contacted with the phosphoric acid by a number of techniques and etched in a batch-wise or continuous manner, as desired. Preferably, the ceramic electrolyte is immersed in the phosphoric acid. When the acid contact period is completed, i.e. when the desired etching has been attained, the phosphoric acid is removed from the etched electrolyte to arrest the acid attack, and preferably, such removal is carried out by rinsing the etched ceramic electrolyte with an alcohol such as methanol. The present etching is carried out so that it has no significant deleterious effect on the resulting etched electrolyte.

The present etched cationically-conductive ceramic electrolyte has an etched surface, i.e. its surface or surface portion is etched, or it has an etched and polished surface, i.e. part of its surface or surface portion is acid-etched and part of it is acid-polished. The present ceramic electrolyte is of symmetric polarization or will show symmetric polarization in a sodium-sulfur cell or battery, or an equivalent or similar type of cell or battery, and it ranges in composition from an alkali metal beta"-alumina phase to a mixture thereof with up to about 50% by volume of alkali metal beta-alumina phase based on the total volume of the electrolyte, said alkali metal being selected from the group consisting of sodium, potassium, lithium, mixtures thereof and alloys thereof.

The present etched or etched/polished ceramic electrolyte is useful in devices such as sodium-sulfur batteries and electrochromic displays. It is particularly useful in the form of a hollow tube closed at one end, in a sodium-sulfur cell or battery, or an equivalent or similar type of cell or battery. Ordinarily, when used as an electrolyte in a sodium-sulfur cell, it has a density higher than about 98%, and preferably higher than about 99%, of the theoretical density for beta-alumina, i.e. 3.26 g/cc.

This invention is further illustrated by the following examples wherein the procedure was as follows unless otherwise noted:

The phase composition of the sintered polycrystalline ceramic tube was determined by X-ray diffraction analysis.

Density was determined in a standard manner.

Charge and discharge resistances were measured in a standard manner using a half cell consisting of $NaNO_3$/electrolyte/Na, where liquid sodium and liquid sodium nitrate at 350° C. are used as electrodes on the inside, and outside of the electrolyte tube, respectively.

EXAMPLE 1

A sintered polycrystalline ceramic hollow tube closed at one end and open at the opposite end with an inner diameter of about 1.0 cm, a wall thickness of about 0.1 cm and a length of about 8 cm was used as an electrolyte. The sintered tube was composed predominantly of sodium beta"-alumina phase, i.e. greater than about 90% by volume of the tube was sodium beta"-alumina phase, and the remainder was sodium beta-alumina phase, and is hereinafter referred to as the beta"-alumina tube. The chemical composition of the beta"-alumina tube was 8.6% by weight $Na_2O$, 1% by weight MgO, 0.5% by weight $Li_2O$ and the balance was $Al_2O_3$. The beta"-alumina tube had a density greater than about 99% of the theoretical density for beta-alumina and had been prepared in a known manner, i.e. the powder composition of 8.6% by weight $Na_2O$, 1% by weight MgO, 0.5% by weight $Li_2O$ and balance $Al_2O_3$ was formed into the shape of a green tube and fired at about 1650° C. in an atmosphere which had no significant deleterious effect on it. The microstructure of this assintered tube is shown in FIG. 1.

The beta"-alumina tube was assembled as a half-cell suitable for electrolyte filling. A sodium nitrate bath was used to fill the cell with liquid sodium. After 15Ah of sodium filling the resistance was measured during both the charge and discharge mode. The following results were obtained at 350° C.:

Charge Resistance $(R_C) = 0.068\Omega$

Discharge Resistance $(R_D) = 0.116\Omega$

Therefore, this tube exhibited asymmetric behavior because $R_D > R_C$. The beta"-alumina tube was then recovered from the cell, and any sodium left inside the tube was washed out with methanol.

85% concentrated ($P_2O_5$ concentration of about 60% by weight) of phosphoric acid was heated at atmospheric pressure and while it was boiling at 120° C., the beta"-alumina tube, which had been preheated to about 120° C. to prevent thermal shock, was suspended and immersed into the boiling viscous phosphoric acid for a total immersion time period of about 3 minutes, and rinsed with the acid at the end of each minute so that the inside surface of the tube was replenished with fresh-hot phosphoric acid. During this time period, the temperature of the acid was continuously raised to about 160° C. to keep the acid boiling. The boiling etching phosphoric acid was a viscous liquid, and from data obtained in other similar experiments, it was estimated that the $P_2O_5$ concentration of the acid increased during boiling to about 65% by weight. The resulting etched tube was cooled to room temperature, washed with methyl alcohol to remove the acid from the surfaces and then vacuum annealed at 1000° C. for two hours to remove the left-over methanol and adsorbed water vapors. The entire surface of the ceramic tube, i.e. the surface within the tube as well as its outer surface, appeared etched. FIG. 2 shows the microstructures of the etched surface which appears to be more distinctive than that of FIG. 1.

The tube appeared not to have been changed significantly in size by the etching, and the etching appeared not to have had any significant deleterious effect on it.

It was believed that the immersion in the boiling phosphoric acid had etched the tube sufficiently to remove the asymmetric causing-phases from its surface as well as the grain boundary areas near the surface.

The etched tube, i.e. etched electrolyte, was then again assembled as a half cell (in the same manner as when it was unetched) for electrolytic filling. The following results were obtained at 350° C. on the cell refilled to 18.5Ah of sodium.

Charge Resistance $(R_C) = 0.047\Omega$

Discharge Resistance $(R_D) = 0.045\ \Omega$

Therefore, the refilled etched tube exhibited symmetric behavior because $R_D = R_C$.

EXAMPLE 2

To be sure that it was the phosphoric acid treatment which produced the symmetric behavior of Example 1, another beta"-alumina tube from the same ceramic batch as the tube of Example 1 was used in this example as an electrolyte. Specifically, the present beta"-alumina tube had the same composition and did not differ in any significant manner from the beta"-alumina tube of Example 1.

The present beta"-alumina tube was etched, cooled to room temperature and washed with methanol in the same manner as set forth in Example 1. The resulting etched tube had the same appearance as the surface of the etched tube of Example 1.

The present etched tube, i.e. etched electrolyte, was assembled as half-cell in substantially the same manner as disclosed in Example 1. After electrolyte filling to 15Ah the resistance was measured at 350° C. with the following results.

Charge Resistance ($R_C$) = 0.044Ω
Discharge Resistance ($R_D$) = 0.041Ω

The results clearly demonstrate that the symmetric polarization was caused by the phosphoric acid treatment.

The following copending U.S. patent applications are assigned to the assignee hereof and are incorporated herein by reference:

Ser. No. 289,579 filed on even date herewith in the name of Raj Narain Singh entitled "ETCHED CATIONICALLY-CONDUCTIVE CERAMIC BODY" discloses a cationically-conductive polycrystalline body having a specific resistivity at its surface portion higher than its specific intrinsic resistivity which is contacted with phosphoric acid to produce an etched body having a uniform specific intrinsic resistivity.

Ser. No. 289,578 filed on even date herewith in the name of Raj Narain Singh entitled "CHEMICALLY POLISHED CERAMIC BODY" discloses an alkali metal beta- and/or beta"-alumina polycrystalline body which is chemically polished by contacting it at a polishing temperature with phosphoric acid of polishing concentration.

What is claimed is:

1. A cationically-conductive ceramic electrolyte body wherein its entire surface is a chemically-etched surface, said ceramic electrolyte body being of symmetric polarization, said ceramic eletrolyte body consisting essentially of a composition ranging from an alkali metal beta"-alumina phase to a mixture of alkali metal beta"-alumina phase and up to about 50% by volume of alkali metal beta-alumina phase based on the total volume of said electrolyte body, said alkali metal being selected from the group consisting of sodium, potassium, lithium, mixtures thereof and alloys thereof.

2. The ceramic electrolyte of claim 1 in the form of a hollow tube closed at one end and useful as an electrolyte in a sodium-sulfur cell.

3. A cationically-conductive ceramic electrolyte body wherein its entire surface is a chemically etched surface, said ceramic electrolyte body being of symmetric polarization, said ceramic electrolyte body consisting essentially of a composition ranging from a sodium beta"-alumina phase to a mixture of sodium beta"-alumina phase and up to about 50% by volume of sodium beta alumina phase based on the total volume of said electrolyte body.

4. A cationically-conductive ceramic electrolyte body wherein its entire surface is a combination of a chemically etched surface and a chemically-polished surface, said ceramic electrolyte body being of symmetric polarization, said ceramic electrolyte body consisting essentially of a composition ranging from an alkali metal beta"-alumina phase to a mixture of alkali metal beta"-alumina phase and up to about 50% by volume of alkali metal beta-alumina phase based on the total volume of said electrolyte body, said alkali metal being selected from the group consisting of sodium, potassium, lithium, mixtures thereof and alloys thereof.

5. The ceramic body of claim 4 in the form of a hollow tube closed at one end and useful as an electrolyte in a sodium-sulfur cell.

6. A cationically-conductive ceramic electrolyte body wherein its entire surface is a combination of a chemically etched surface and a chemically polished surface, said ceramic electrolyte body being of symmetric polarization, said ceramic electrolyte body consisting essentially of a composition ranging from sodium beta"-alumina phase to a mixture of sodium beta"-alumina phase and up to about 50% by volume of sodium beta-alumina phase based on the total volume of said electrolyte body.

7. A cationically-conductive ceramic electrolyte body wherein its entire surface is a chemically-etched surface or a combination of a chemically etched surface and a chemically polished surface, said ceramic electrolyte body being of symmetric polarization, said ceramic electrolyte body consisting essentially of a composition ranging from sodium beta"-alumina phase to a mixture of sodium beta"-alumina phase and up to about 50% by volume of sodium beta-alumina phase based on the total volume of said electrolyte body, said body containing a stabilizer for said sodium beta"-alumina phase.

8. The cationically-conductive ceramic electrolyte body of claim 7, wherein said stabilizer is selected from the group consisting of $LiO_2$, MgO, NiO, CoO and mixtures thereof.

* * * * *